C. A. MAGNUSON.
NUT LOCK.
APPLICATION FILED APR. 10, 1919.

1,353,602.

Patented Sept. 21, 1920.

INVENTOR
CARL A MAGNUSON.

BY
C. F. Blake
ATTORNEY

UNITED STATES PATENT OFFICE.

CARL A. MAGNUSON, OF PORTLAND, OREGON.

NUT-LOCK.

1,353,602.　　　Specification of Letters Patent.　　Patented Sept. 21, 1920.

Application filed April 10, 1919. Serial No. 289,147.

*To all whom it may concern:*

Be it known that I, CARL A. MAGNUSON, a citzen of the United States, residing at Portland, county of Multnomah, State of Oregon, have invented certain new and useful improvements in Nut-Locks, of which the following is a specification.

My invention relates to methods of fastening nuts of bolts so that they will not become loosened by vibration, and the object of my invention is to produce such a fastening as will be simple of application, cheap to manufacture, positive in operation, and independent of the relative point of rotation of the nut.

I accomplish this object by means of the construction illustrated in the accompanying drawing, which is a part of this application for Letters Patent, like characters of reference indicating like parts throughout the several views thereof, and in which.

Figure 1:
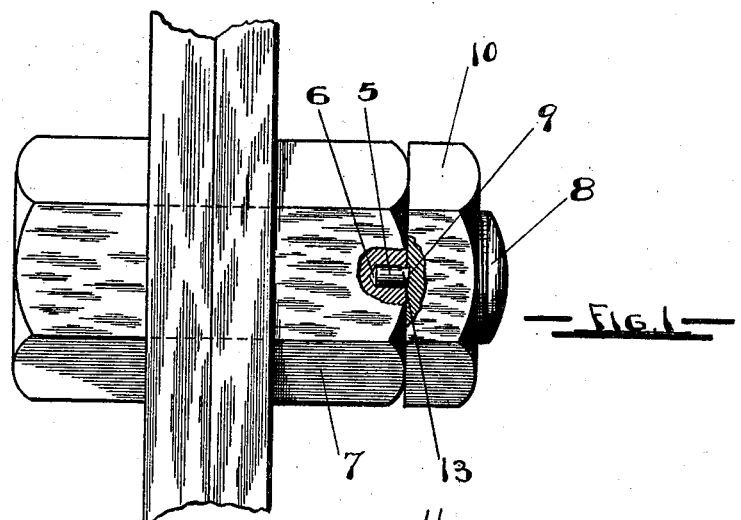
Figure 1 shows my device applied between a nut and a lock nut.

In its preferred form my device consists of a dog 5 inserted within an orifice 6 in the face of the main nut 7 of the bolt 8, said dog having a slightly chamfered end 9, which allows the lock 10 to be screwed up but which bites into the lock nut and thus prevents the unscrewing of the same by vibration, as shown in Fig. 1.

The lock 10 may be unscrewed by applying sufficient force thereto with a wrench, but no amount of vibration will loosen the same.

Figure 2:
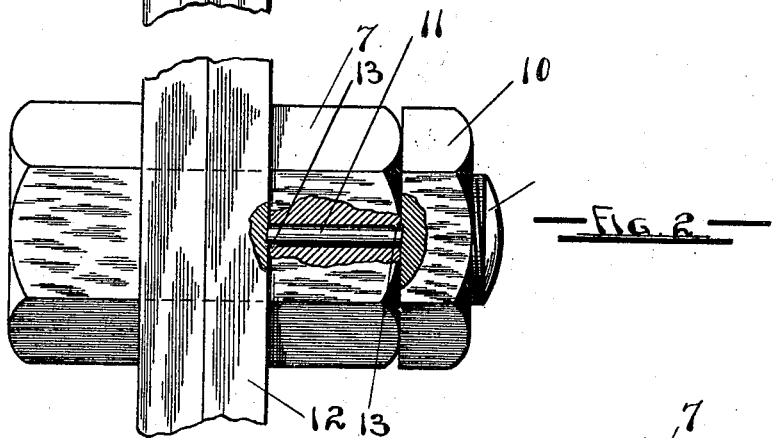
Fig. 2 shows a modified form of my device, which operates between the lock nut and the member immediately in contact with the main nut.

In the modified form illustrated in Fig. 2, the orifice in the main nut extends entirely through the same, and the dog 11 is chamfered at each end, the chamfers being parallel to each other, so that the dog bites into both the lock nut 10 and the member 12 immediately adjacent the main nut 7.

It is obvious from the drawing that the dog will function when the lock nut is sufficiently tight irrespective of the angular position of the nuts upon the bolt.

Figure 3:
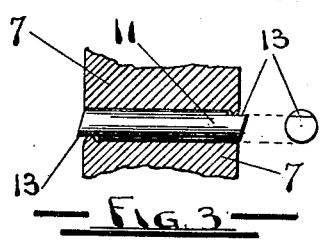
Fig. 3 is a detail of the locking dog.
Figure 4:
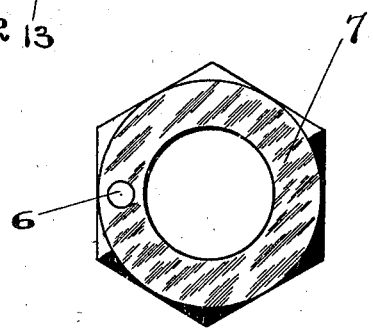
Fig. 4 is a face view of the main nut.

In order to retain the dog within the main nut 7 as well as to prevent the dog from turning within the orifice 6, I cut away a portion of the periphery of the dog at the point of the chamfer, thereby producing a flat side 13 thereon. When the dog is inserted within the orifice 6, the side of said orifice adjacent said flat surface or side 13 is punched inward to contact with said flat side 13 of dog 11, as shown in Fig. 3, thereby making the dog a prisoner within the orifice as well as preventing the dog from turning therein.

My invention may be made of any size and constructed of any material deemed convenient and suitable for a device of this character and while I have illustrated and described a form of construction found desirable in materializing my invention, I wish to include in this application for Letters Patent all mechanical equivalents and substitutes that may fairly come within the scope and purview of my invention as defined in the appended claim.

Having disclosed my invention so that others may be enabled to construct and to use the same, what I claim as new, and desire to secure by Letters Patent is:

A nut having a circular orifice therein; a cylindrical dog having a chamfered end and adapted for insertion within said orifice; a flat face upon the periphery of said dog parallel to the axis thereof; and an upset portion of the surface of said orifice adapted to contact with said face.

In testimony whereof I claim the foregoing as my own, I hereunto affix my signature at Portland, county of Multnomah, State of Oregon, this 2nd day of April, 1919.

CARL A. MAGNUSON.

Witness:
C. F. BLAKE.